(12) United States Patent
Gueneau et al.

(10) Patent No.: US 11,618,579 B2
(45) Date of Patent: Apr. 4, 2023

(54) ASSEMBLY OF A PYLON WITH A WING OF AN AIRCRAFT

(71) Applicant: Airbus Operations SAS, Toulouse (FR)

(72) Inventors: Germain Gueneau, Toulouse (FR); Thomas Robiglio, Toulouse (FR); Michael Berjot, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 30 days.

(21) Appl. No.: 17/488,540

(22) Filed: Sep. 29, 2021

(65) Prior Publication Data
US 2022/0106048 A1 Apr. 7, 2022

(30) Foreign Application Priority Data

Oct. 2, 2020 (FR) ...................................... 2010077

(51) Int. Cl.
*B64D 27/26* (2006.01)
*B64C 3/18* (2006.01)

(52) U.S. Cl.
CPC ............ *B64D 27/26* (2013.01); *B64C 3/187* (2013.01); *B64D 2027/264* (2013.01); *B64D 2027/268* (2013.01)

(58) Field of Classification Search
CPC ............ B64D 27/26; B64D 2027/264; B64D 2027/268; B64D 27/12; B64D 27/18; B64D 2027/26; B64C 3/187; B64C 27/262
See application file for complete search history.

(56) References Cited

U.S. PATENT DOCUMENTS

| 5,054,715 | A | * | 10/1991 | Hager | ................... | B64D 27/18 244/54 |
| 6,095,456 | A |   | 8/2000  | Powell |   |   |
| 2008/0217467 | A1 |   | 9/2008 | Lafont |   |   |
| 2008/0217502 | A1 | * | 9/2008 | Lafont | ................... | B64D 27/26 248/554 |

(Continued)

FOREIGN PATENT DOCUMENTS

| CA | 2645233 A1 * | 5/2009 | ............ B64D 27/26 |
| EP | 3696095 A1 * | 8/2020 | ............ B64D 27/18 |

(Continued)

OTHER PUBLICATIONS

French Search Report; priority document.

*Primary Examiner* — Assres H Woldemaryam
(74) *Attorney, Agent, or Firm* — Greer, Burns & Crain, Ltd.

(57) ABSTRACT

An assembly of a pylon and of a wing of an aircraft, the pylon including a primary structure with a rear face and an upper spar. The assembly includes a rear fastening system including a pair of vertical shackles articulated between the rear face of the primary structure and a first shoe fastened to the wing, wherein the shackles are fastened to the primary structure by a clevis-type connection, and a pair of transverse shackles articulated between the rear face of the primary structure and a second shoe fastened to the wing, wherein the shackles are fastened to the primary structure by a clevis-type connection. With such an assembly, the bulk of the rear fastening system is reduced.

4 Claims, 3 Drawing Sheets

(56) References Cited

U.S. PATENT DOCUMENTS

| | | | |
|---|---|---|---|
| 2009/0032673 A1* | 2/2009 | Dron .................... | B64D 27/26 |
| | | | 248/557 |
| 2010/0090056 A1 | 4/2010 | Gardes et al. | |
| 2011/0127371 A1 | 6/2011 | Takeuchi | |
| 2015/0175268 A1* | 6/2015 | Guillou ................ | B64D 27/26 |
| | | | 244/54 |
| 2020/0369396 A1* | 11/2020 | Labarthe ............... | B64D 27/26 |

FOREIGN PATENT DOCUMENTS

| | | | | |
|---|---|---|---|---|
| FR | 2915178 A1 | | 10/2008 | |
| FR | 2934845 A1 * | | 2/2010 | ............ B64D 27/26 |
| WO | 2007012667 A1 | | 2/2007 | |
| WO | WO-2009027336 A1 * | | 3/2009 | ............ B64D 27/18 |

* cited by examiner

ASSEMBLY OF A PYLON WITH A WING OF AN AIRCRAFT

CROSS-REFERENCES TO RELATED APPLICATIONS

This application claims the benefit of the French patent application No. 2010077 filed on Oct. 2, 2020, the entire disclosures of which are incorporated herein by way of reference.

FIELD OF THE INVENTION

The present invention relates to an assembly of a pylon with an aircraft wing.

BACKGROUND OF THE INVENTION

Conventionally, an aircraft comprises at least one jet engine fastened beneath each of its wings by means of a pylon made up of a primary structure in the form of a rigid box. The pylon is attached isostatically beneath the wing by means of fastening members for fastening the pylon to the wing. The fastening members are made up of a front fastening system disposed generally halfway along the primary structure, a rear fastening system disposed at the rear of the primary structure and an intermediate fastening system disposed between the front and rear fastening systems.

With reference to FIG. 1, the front fastening system 2a, situated on the upper spar 3 of the pylon 1, comprises two pairs of two-point connecting rods 5, distributed on either side of a longitudinal median plane V of the primary structure 4, separating the latter into two parts, left and right. Each two-point connecting rod 5a extends parallel to the longitudinal axis X of the pylon 1 and the two connecting rods 5a of a pair of connecting rods 5 are, on the one hand, received between the arms of a fastening clevis 6 with three arms secured to the primary structure 4, and are mounted articulated to said clevis via a pin 7 oriented perpendicular to the longitudinal median plane V, and are, on the other hand, intended to be articulated to the wing (not shown).

The intermediate fastening system 2b, situated on the upper spar 3 of the pylon 1, comprises a spigot-type peg 8, which extends in the longitudinal median plane V and is intended to be inserted into a bore provided for that purpose in the wing.

The rear fastening system 2c, which is also situated on the upper spar 3 of the pylon 1, comprises two pairs of three-point connecting rods 10, called triangular connecting rods. Each triangular connecting rod 10a substantially has the shape of an isosceles triangle with a through-bore at each corner. Each triangular connecting rod 10 extends perpendicular to the longitudinal median plane V. On each side of this plane, and symmetrically with respect thereto, the two pairs of triangular connecting rods 10 sandwich a fastening tab 11 secured to the primary structure 4, and are articulated thereto by a clevis-type connection with a longitudinally oriented pin 12. Each triangular connecting rod 10a is also intended to be articulated at a point to the wing.

This configuration is satisfactory but involves a significant distance between the wing and the upper spar in order to be able to integrate the rear fastening system. The specific shape of the triangular connecting rods does not make it possible to further reduce this distance.

There is a need to find a design for a rear fastening system that is more compact in order to reduce the bulk of the assembly of the pylon with the wing.

SUMMARY OF THE INVENTION

An aim of the present invention is to meet all or part of this need. To this end, the invention relates to an assembly of a pylon with an aircraft wing, the pylon comprising a primary structure extending from front to rear along a longitudinal axis and having the form of a box with a rear face and an upper spar forming an upper face of the box, a longitudinal median plane separating the primary structure into two parts, left and right, the assembly comprising a front fastening system for fastening the pylon to the wing, which system is arranged on the upper face of the box halfway along the primary structure, a rear fastening system for fastening the pylon to the wing, which system is arranged at the rear of the primary structure, and an intermediate fastening system for fastening the pylon to the wing, which system is arranged on the upper face of the box between the front and rear fastening systems, the rear fastening system comprising:

a pair of vertical shackles mounted so as to be articulated between the rear face of the primary structure and a first shoe fastened to the wing, wherein the shackles are fastened to the primary structure by a clevis-type connection with a pin oriented transversely with respect to the pylon, and a pair of transverse shackles mounted so as to be articulated between the rear face of the primary structure and a second shoe fastened to the wing, wherein the shackles are fastened to the primary structure by a clevis-type connection with a pin oriented longitudinally with respect to the pylon.

With such an assembly, the bulk of the rear fastening system is reduced.

Advantageously, the shackles of the pair of vertical shackles are fastened to the rear face by a first fitting fastened to the rear face and sandwiched between the shackles of the pair of vertical shackles.

Advantageously, the shackles of the pair of transverse shackles are fastened to the rear face by a second fitting fastened to the rear face and sandwiched between the shackles of the pair of transverse shackles.

BRIEF DESCRIPTION OF THE DRAWINGS

The abovementioned features of the invention, along with others, will become more clearly apparent upon reading the following description of an exemplary embodiment, said description being given with reference to the appended drawings, in which.

DETAILED DESCRIPTION OF THE PREFERRED EMBODIMENTS

Figures 1, 2:
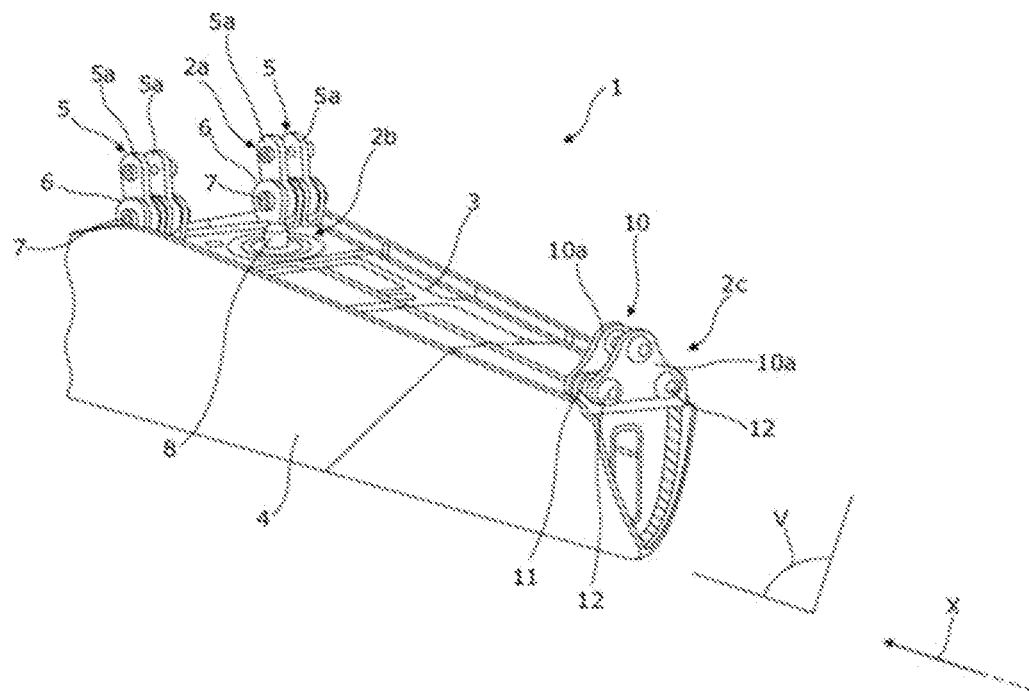
FIG. 1, which has already been described, is a perspective view of the rear of an aircraft pylon with fastening members for fastening the pylon to an aircraft wing, according to the prior art.
FIG. 2 is a side view of an assembly of a pylon with an aircraft wing by means of fastening members for fastening the pylon to a wing, comprising a rear fastening system according to one embodiment of the invention.
Figure 3:
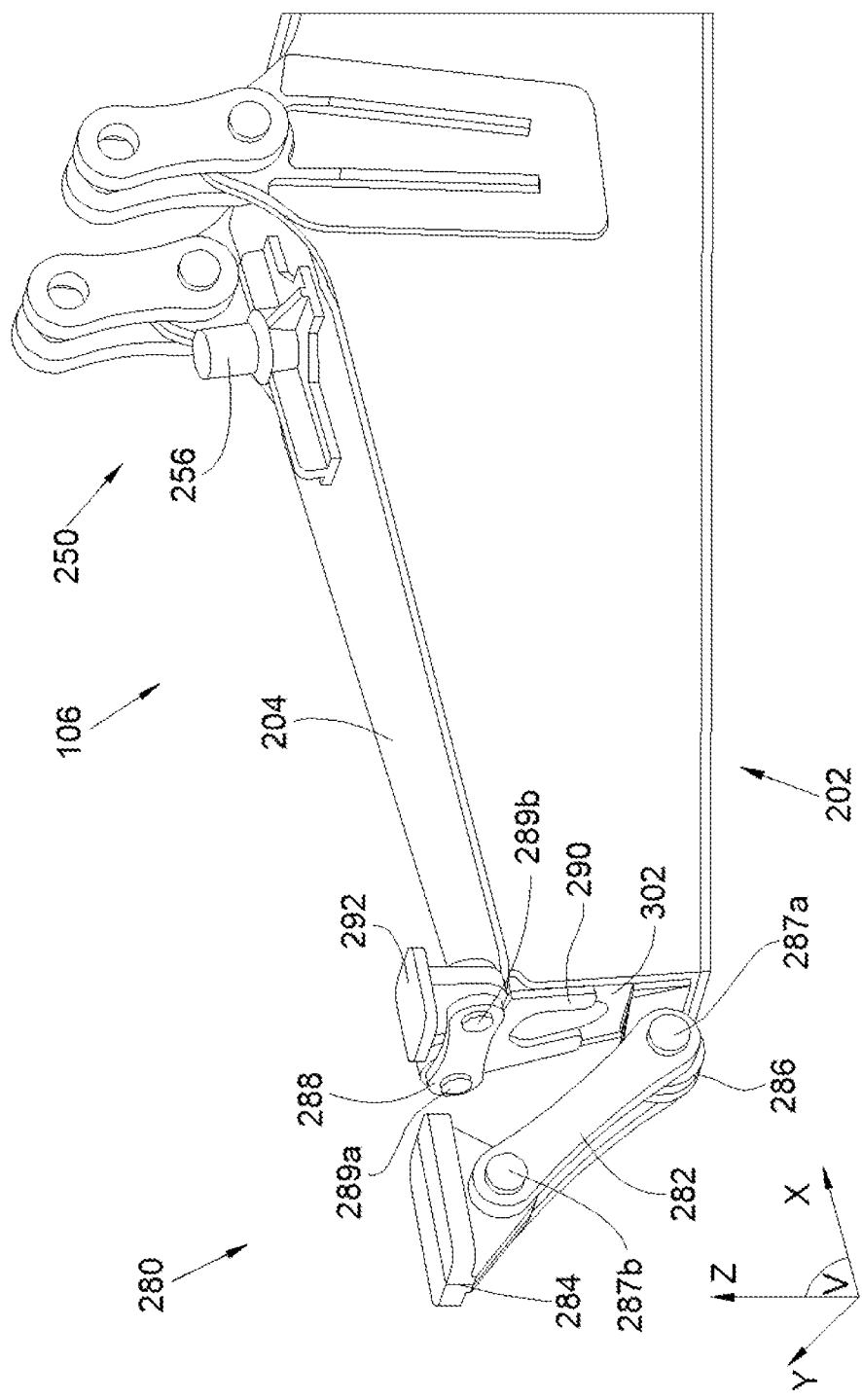
FIG. 3 is a perspective view of the zone III in FIG. 2 showing in detail the rear fastening system according to the embodiment of the invention.
Figure 4:
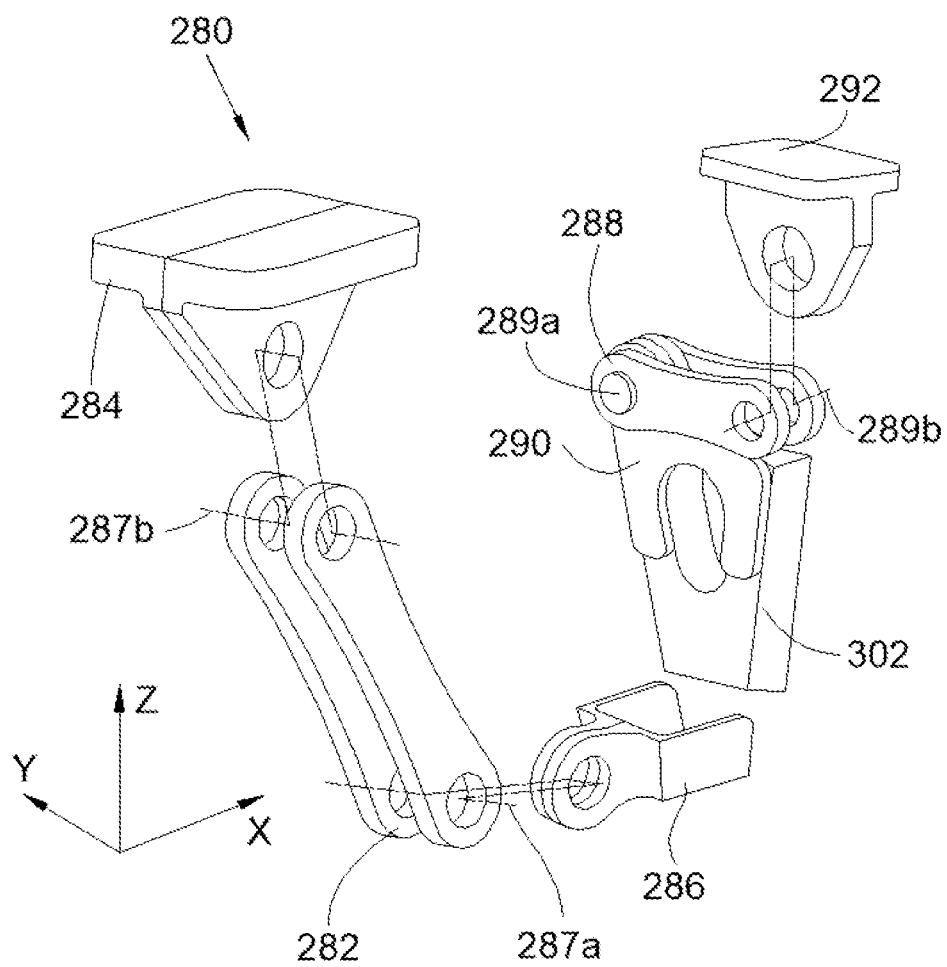
FIG. 4 is an exploded perspective view of the rear fastening system shown in FIG. 3, according to the embodiment of the invention.

With reference to FIGS. 2 to 4, an assembly of a pylon 106 with a wing 104 of an aircraft is realized by means of fastening members. The pylon 106 is fastened isostatically beneath the wing 104 and is intended to support a jet engine (not shown) fastened beneath the pylon 106. The wing 104 is depicted here by its pressure-side panel 216 fastened to a structure of the wing 104.

In the description, terms relating to a position are considered with reference to the arrow F representing the direction of forward movement of the wing/pylon through the air under the effect of the thrust provided by the jet engine.

In a known manner, the pylon 106 comprises a primary structure 202 in the form of a rigid box that extends lengthwise from front to rear along a longitudinal axis X, parallel to the direction of forward movement F of the aircraft.

The longitudinal median plane V is the plane that is parallel to the longitudinal axis X and orthogonal to the ground (i.e., to the horizontal) and that divides the primary structure 202 into two parts, left and right.

The primary structure 202 comprises an upper spar 204 that forms the upper face of the box and that is arranged facing the wing 104 beneath which the pylon 106 is mounted. A rib 302 (shown as transparent in FIG. 2), situated at the rear end of the box, extends perpendicular to the longitudinal median plane V and closes the box so as to form the rear face thereof The fastening members conventionally comprise a front fastening system 250 for fastening the pylon 106 to the wing 104, which system is arranged on the upper face of the primary structure 202, generally halfway along the latter, a rear fastening system 280 for fastening the pylon 106 to the wing 104, which system is disposed at the rear of the primary structure, and an intermediate fastening system 256 for fastening the pylon 106 to the wing 104, which system is disposed on the upper face between the front fastening system 250 and the rear fastening system 280.

In the embodiment illustrated in FIG. 2, the front fastening system 250 and the intermediate fastening system 256 are of identical design to those of the prior art as described above with reference to FIG. 1 and will not be described further. The front fastening system 250 is provided to react the vertical forces (in the longitudinal median plane V and perpendicular to the longitudinal axis X), whereas the intermediate fastening system 256 is provided to react the transverse forces (perpendicular to the median longitudinal plane V) and the longitudinal forces.

According to the invention, the rear fastening system 280 comprises a pair of vertical shackles 282 mounted so as to be articulated between the rear face of the primary structure 202, and, more particularly, a first fitting 286, and a first shoe 284 fastened to the wing 104 and, more particularly in this case, to the pressure-side panel 216.

The pair of vertical shackles 282 is in this case fastened to the primary structure 202 by the first fitting 286 that is fastened to the primary structure 202 at the rear rib 302, i.e., at the rear face.

Each shackle of the pair of vertical shackles 282 can be doubled.

The shackles of the pair of vertical shackles 282 sandwich the first fitting 286, on the one hand, and the first shoe 284, on the other hand The shackles are fastened to the primary structure 202 by a clevis-type connection with a pin 287*a-b* oriented transversely with respect to the pylon 106 and passing through the pair of vertical shackles 282 and the first fitting 286 or the first shoe 284. The shackles of the pair of vertical shackles 282 are oriented more or less vertically.

The first shoe 284 is fastened to the pressure-side panel 216, for example, by welding or by putting in place threaded fasteners.

In the same way, the first fitting 286 is fastened to the rear face of the primary structure 202, for example by welding or by putting in place threaded fasteners.

The pair of vertical shackles 282 makes it possible to react the forces mainly in the Z direction.

The rear fastening system 280 also has a pair of transverse shackles 288 mounted so as to be articulated between the rear face of the primary structure 202, and, more particularly, a second fitting 290, and a second shoe 292 fastened to the wing 104 and, more particularly in this case, to the pressure-side panel 216.

The pair of transverse shackles 288 is, in this case, fastened to the primary structure 202 by the second fitting 290 that is fastened to the primary structure 202 at the rear rib 302, i.e., at the rear face.

Each shackle of the pair of transverse shackles 288 can be doubled.

The shackles of the pair of transverse shackles 288 sandwich the second fitting 290, on the one hand, and the second shoe 292, on the other hand The shackles are fastened to the primary structure 202 by a clevis-type connection with a pin 289*a-b* oriented longitudinally and passing through the pair of transverse shackles 288 and the second fitting 290 or the second shoe 292. The shackles of the pair of transverse shackles 288 are oriented more or less horizontally and transversely with respect to the longitudinal direction X.

The second shoe 292 is fastened to the pressure-side panel 216, for example by welding or by putting in place threaded fasteners.

In the same way, the second fitting 290 is fastened to the primary structure 202, for example by welding or by putting in place threaded fasteners.

The pair of transverse shackles 288 makes it possible to react the forces mainly in the Y direction. Furthermore, the position of the pair of transverse shackles 288 as close as possible to the wing 104 makes it possible to reduce the introduction of secondary moments in the assembly.

The pylon 106 is then as close as possible to the wing 104 as a result of the reduced height at the rear of the pylon 106. Furthermore, the width of the pylon 106 at the rear is reduced with respect to the prior art, and the inclination of the lateral panels of the pylon 106 is accentuated allowing better aerodynamic performance.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly of a pylon and of a wing of an aircraft, the pylon comprising:

a primary structure that extends from front to rear along a longitudinal axis and that is formed as a box with a rear face and an upper spar forming an upper face of the box, a longitudinal median plane separating the primary structure into two parts, left and right, the assembly comprising:

a front fastening system configured to fasten the pylon to the wing, which front fastening system is arranged on the upper face of the box halfway along the primary structure, a rear fastening system configured to fasten the pylon to the wing, which rear fastening system is arranged at the rear of the primary structure, and an intermediate fastening system for fastening the pylon to the wing, which intermediate fastening system is arranged on the upper face of the box between the front and rear fastening systems, the rear fastening system comprising:

a pair of vertical shackles mounted to be articulated between the rear face of the primary structure and a first shoe fastened to the wing, wherein the vertical shackles are fastened to the primary structure by a clevis-type connection with a pin oriented transversely with respect to the pylon, and a pair of transverse shackles mounted to be articulated between the rear face of the primary structure and a second shoe fastened to the wing, wherein the transverse shackles are fastened to the primary structure by a clevis-type connection with a pin oriented longitudinally with respect to the pylon.

2. The assembly according to claim 1, wherein the transverse shackles of the pair of transverse shackles are fastened to the rear face by a second fitting fastened to the rear face and sandwiched between the transverse shackles of the pair of transverse shackles.

3. The assembly according to claim 1, wherein the vertical shackles of the pair of vertical shackles are fastened to the rear face by a first fitting fastened to the rear face and sandwiched between the vertical shackles of the pair of vertical shackles.

4. The assembly according to claim 2, wherein the transverse shackles of the pair of transverse shackles are fastened to the rear face by a second fitting fastened to the rear face and sandwiched between the transverse shackles of the pair of transverse shackles.

\* \* \* \* \*